July 21, 1970     HISASHI SAITO     3,521,275
ALARM BUZZER FOR BICYCLES HAVING PIVOTED ACTUATING KNOB
Filed Jan. 13, 1969
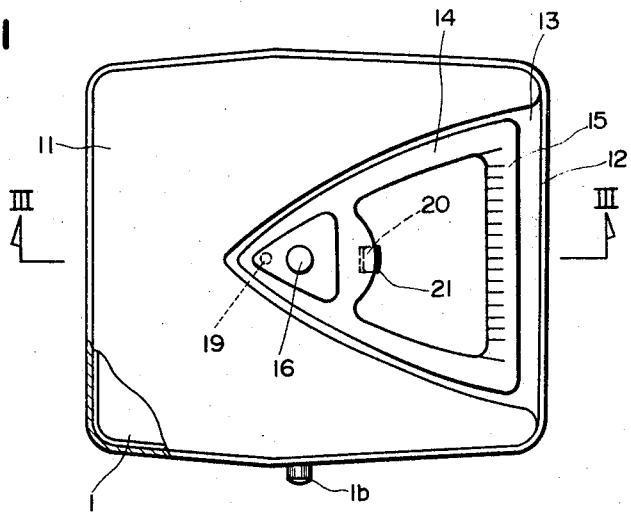
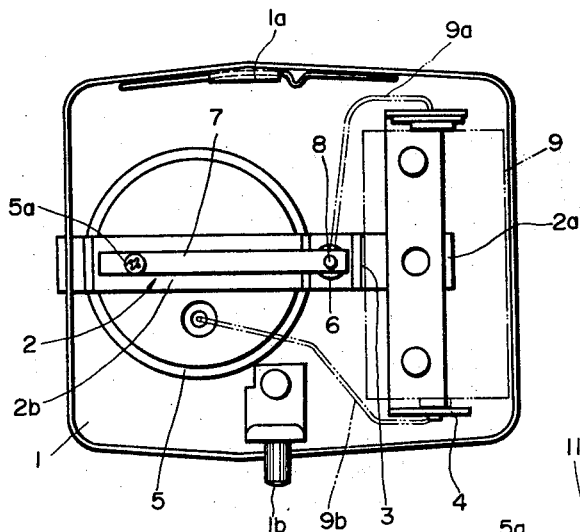
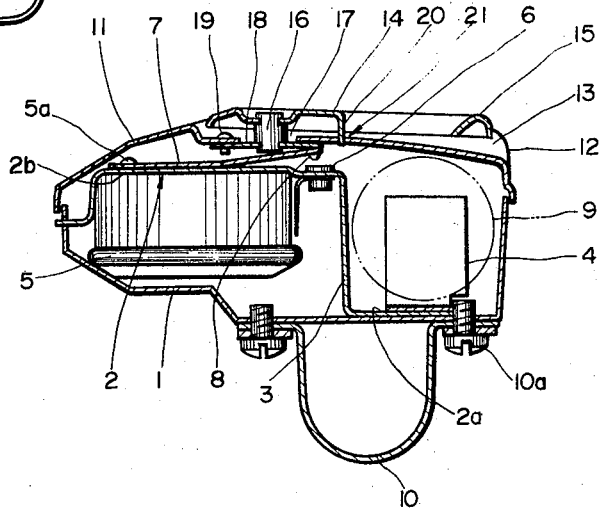

United States Patent Office 3,521,275
Patented July 21, 1970

3,521,275
ALARM BUZZER FOR BICYCLES HAVING
PIVOTED ACTUATING KNOB
Hisashi Saito, Nagoya, Japan, assignor to Kabushiki Kaisha Saikosha Seisakusho Nishitakayama-cho, Kasugai, Aichi-Prefecture, Japan, a corporation of Japan
Filed Jan. 13, 1969, Ser. No. 790,676
Claims priority, application Japan, May 22, 1968, 43/42,120
Int. Cl. G08b 3/00
U.S. Cl. 340—384                     1 Claim

ABSTRACT OF THE DISCLOSURE

An alarm buzzer for bicycles with an improved reliability, which has a pivoted actuating knob whose operating portion is substantially longer than the thumb of a bicycle driver. The alarm buzzer has a casing containing a buzzer element, a dry cell, and an electric switch for making and breaking an electric circuit through the dry cell and the buzzer element. The actuating knob is pivoted on a lid of the casing and biased away from the casing by a spring. By depressing of the knob toward the casing at any part of the operating portion of the actuating knob, the switch is closed to actuate the buzzer element.

This invention relates to an alarm buzzer for bicycles, and more particularly to an alarm buzzer for bicycles having a pivoted actuating knob whose operating portion is substantially longer than the thumb of a bicycle driver for ensuring reliable operation thereof.

A known alarm buzzer for bicycles has an actuating push button of a comparatively small size, for instance, a push button as large as the tip of a finger. With such small push button, a bicycle driver is apt to fail in actuating the alarm buzzer when an alarm sound is necessary, because the bicycle driver has to find out the small actuating knob by feeling without seeing it while concentrating his attention on road conditions. Thus, the known alarm buzzer for bicycles has a disadvantage in that its operation is not always reliable.

Therefore, an object of the present invention is to obviate the aforesaid disadvantage of the known alarm buzzer for bicycles by providing an alarm buzzer having an improved reliability. According to the present invention, there is provided an alarm buzzer for bicycles, which comprises a casing, a buzzer element secured to the casing, a dry cell replaceably mounted on the casing, an electric switch for making and breaking an electric circuit through the buzzer element and the dry cell, a lid hinged to the casing, an actuating knob having an operating portion substantially longer than the thumb of a bicycle driver, said actuating knob being pivotally secured on outer surface of said lid and being biased away from said lid by a spring, and a pin secured to said actuating knob so as to close said switch upon depression of said actuating knob at any part of said operating portion against said spring. With the alarm buzzer according to the present invention, reliability of the alarm buzzer is greatly improved, because the bicycle driver can easily actuate the buzzer by depressing any part of the thumb-operating portion of the actuating knob by feeling.

Other objects and a fuller understanding of the present invention may be had by referring to the following description and claim, taken in conjunction with the accompanying drawings, in which:

FIG. 1 is a plan view of an alarm buzzer for bicycles according to the present invention, with a part thereof cut away, FIG. 2 is a plan view of the alarm buzzer, shown with a lid removed, and FIG. 3 is a sectional view of the alarm buzzer, taken along the line III—III of FIG. 1.

Like parts and members are designated by like numerals and symbols throughout the drawings.

Referring to FIGS. 2 and 3, illustrating an embodiment of the present invention, a casing 1 has a substantially U-shaped buzzer holder 2 secured thereto, and a buzzer element 5 is mounted on a horizontal portion 2b of the buzzer holder 2 by a suitable means, such as a screw 5a. A battery holder 4 is also secured to the casing 1, so as to hold a dry cell 9 therein. In this particular embodiment, the buzzer holder 2 has an extended portion 2a mechanically joined to the battery holder 4 to reinforce the mechanical strength of the casing 1. A stationary electric contact 6 is mechanically connected to the horizontal portion 2b of the buzzer holder 2 at about the center of the casing 1. The stationary contact 6 is, however, electrically insulating member (not shown) therebetween. A resilient member 7 is secured to the horizontal portion 2b of the buzzer holder 2 at one end thereof in such manner that a movable contact 8 secured to the opposite end of the resilient member 7 faces said stationary contact 6 with clearance from it. A mounting fixture 10 for mounting the alarm buzzer on a bicycle handle is connectable to the bottom of the casing 1 by suitable screws 10a or the like.

A lid 11 of the casing 1 is hinged to the casing 1 at one edge thereof by a hinge means 1a, and a lock means 1b mounted on the casing 1 is engageable with the opposite edge of the lid 11 to selectively lock the lid 11 on the casing 1. Referring to FIG. 1, a substantially triangular recess 13 is formed on the lid 11, with a vertex located substantially at the center of the lid. The side of the triangular recess opposite to the vertext is on an edge 12 of the lid which is to be disposed close to a bicycle driver. An actuating knob 14, which is similar in shape to the recess 13, is pivotally secured to the lid 11 at the center of the lid, or at the vertex of the recess, by a rivet 19. In this particular embodiment, as illustrated in the figures, the actuating knob 14 is of substantially equilateral triangular shape, and the side of the triangular actuating knob 14 opposite to the pivoted vertex constitutes an operating portion 15 which is substantially longer than the thumb of a bicycle driver. A pin 16 is secured to the actuating knob 14 in the proximity of the rivet 19, or the vertex of the actuating member 14. The pin 16 extends toward the resilient member 7 through a hole 17 bored on the recess 13, when the lid 11 is locked to the casing 1. A leaf spring 18 is secured to the lid 11 on the surface opposite to the actuating knob 14 by the same rivet 19, and the extended end of the pin 16 is connected to the leaf spring 18. The leaf spring 18 biases the actuating knob 14 away from the recess 13. In order to guide the movement of the actuating knob 14 relative to the recess 13, a guide lug 20 is formed integral with the actuating knob 14 so as to slidably fit in a guide hole 21 bored on the recess 13.

Two terminals of the buzzer element 5 are connected to the movable contact 8 and one of the two electrodes of the dry cell 9, respectively. The other electrode of the dry cell is connected to the stationary contact 6 by a lead wire 9a. Another lead wire 9b provides the aforesaid connection between the dry cell 9 and the buzzer element 5.

The bicycle alarm buzzer of the aforesaid construction, according to the present invention, is so mounted on a bicycle handle by the mounting fixture 10 that the operating portion 15 of the actuating knob 14 extends toward the bicycle driver. Thus, when a driver's finger depresses any part of the operating portion 15 of the actuating knob 14, which is substantially longer than his thumb, the actuating knob 14 is swung downwards about the rivet 19, so that the resilient member 7 is depressed downwards by the pin 16 for bringing the movable contact 8 into electric contact with the stationary contact 6. Thereby, a circuit is completed through the buzzer element 5 and the dry cell 9, and the buzzer element 5 is actuated and an alarm sound is generated.

As described in the foregoing, according to the present invention, there is provided an improved bicycle alarm buzzer having an operating portion substantially longer than the thumb of a bicycle driver, so that the alarm buzzer can be easily actuated by feeling without seeing it. Furthermore, the enlarged actuating knob, as compared with finger-tip size knobs of known alarm buzzers, gives a feeling of improved stability and reliability to the bicycle driver. Thus, the invention contributes greatly to the industry.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:
1. An alarm buzzer for bicycles, comprising a casing, a buzzer element secured to the casing, a dry cell replaceably accommodated in the casing, an electric switch for making and breaking an electric circuit through the buzzer element and the dry cell, a lid hinged to the casing, an actuating knob having an operating portion substantially longer than the thumb of a bicycle driver, said actuating knob being pivotally secured on outer surface of said lid and being biased away from said lid by a spring, and a pin secured to said actuating knob so as to close said switch upon depression of said actuating knob at any part of said operating portion against said spring.

References Cited

UNITED STATES PATENTS 3,103,660  9/1963  Ticktin _____ 340—384 X

HAROLD I. PITTS, Primary Examiner

U.S. Cl. X.R.

340—84, 88, 407